US008812669B2

(12) United States Patent
Jaeger et al.

(10) Patent No.: US 8,812,669 B2
(45) Date of Patent: Aug. 19, 2014

(54) DEVICE FOR GENERATING A VIRTUAL NETWORK USER

(75) Inventors: Hubert Jaeger, Pullach (DE); Arnold Monitzer, Pullach (DE)

(73) Assignee: Uniscon Universal Identity Control GmbH, Munich (DE)

( * ) Notice: Subject to any disclaimer, the term of this patent is extended or adjusted under 35 U.S.C. 154(b) by 145 days.

(21) Appl. No.: 13/187,027

(22) Filed: Jul. 20, 2011

(65) Prior Publication Data

US 2011/0283343 A1  Nov. 17, 2011

Related U.S. Application Data

(63) Continuation of application No. PCT/EP2010/000392, filed on Jan. 22, 2010.

(30) Foreign Application Priority Data

Jan. 22, 2009  (DE) .................. 10 2009 005 810

(51) Int. Cl.

| G06F 15/173 | (2006.01) |
|---|---|
| G06Q 20/34 | (2012.01) |
| G06Q 20/20 | (2012.01) |
| H04L 29/06 | (2006.01) |
| G06Q 20/02 | (2012.01) |
| G06Q 20/38 | (2012.01) |
| G06Q 20/40 | (2012.01) |
| H04L 9/32 | (2006.01) |
| G06F 21/32 | (2013.01) |
| G06F 21/77 | (2013.01) |
| G06F 21/62 | (2013.01) |
| G06F 21/31 | (2013.01) |

(52) U.S. Cl.
CPC .............. *G06Q 20/34* (2013.01); *G06Q 20/206* (2013.01); *G06Q 20/02* (2013.01); *G06Q 20/383* (2013.01); *G06Q 20/4014* (2013.01); *H04L 63/30* (2013.01); *H04L 63/00* (2013.01); *H04L 63/0421* (2013.01); *H04L 63/0407* (2013.01); *H04L 9/3231* (2013.01); *G06F 21/32* (2013.01); *G06F 21/77* (2013.01); *G06F 21/6254* (2013.01); *G06F 21/31* (2013.01); *G06F 2221/2115* (2013.01)

USPC .............................. 709/225; 726/4; 713/182

(58) Field of Classification Search
CPC ...... G06Q 20/206; G06Q 20/34; G06Q 20/02; G06Q 20/383; G06Q 20/4014; H04L 63/30; H04L 63/00; H04L 63/0421; H04L 63/0407; H04L 9/3231; G06F 21/32; G06F 21/77; G06F 21/6254; G06F 21/31; G06F 2221/2115
USPC .............................. 709/225; 726/4; 713/182
See application file for complete search history.

(56) References Cited

U.S. PATENT DOCUMENTS

| 2002/0128952 | A1* | 9/2002 | Melkomian et al. ............ 705/37 |
| 2003/0172090 | A1 | 9/2003 | Asunmaa et al. |

(Continued)

FOREIGN PATENT DOCUMENTS

WO  2005/034424  4/2005

OTHER PUBLICATIONS

Wikipedia: "Telecommunications data retention", Jan. 12, 2009, retrieved from the Internet URL:http://en.wikipedia.org/w/index.php?title=Telecommunications_data_retention&oldid=263559583> on May 31, 2010.

(Continued)

*Primary Examiner* — Oleg Survillo
(74) *Attorney, Agent, or Firm* — Myers Wolin, LLC

(57) ABSTRACT

A device for generating a virtual network user that can be used, for data protection purposes, as a pseudonym by which a physical person or legal entity can gain access to the Internet and engage services that can be implemented via the network. The network user is defined by a freely specifiable combination of real and/or arbitrarily specifiable attributes. The input of these attributes into the network access device (PC) of the user activates a transformation system which facilitates the generation of the data flows that implement the virtual network user and that can be saved with the temporal sequence of the data flow in a storage device of the transformation system. An access system allocated to an independent authority is provided, which upon activation can initiate the readout of such data from a memory allocated to the storage device of the transformation system.

10 Claims, 3 Drawing Sheets

(56) References Cited

U.S. PATENT DOCUMENTS

| | | | |
|---|---|---|---|
| 2006/0107052 A1* | 5/2006 | Guthery | 713/172 |
| 2007/0013692 A1* | 1/2007 | Jung et al. | 345/419 |
| 2008/0052392 A1* | 2/2008 | Webster et al. | 709/224 |
| 2008/0072063 A1* | 3/2008 | Takahashi et al. | 713/186 |
| 2008/0092065 A1* | 4/2008 | Jung et al. | 715/757 |
| 2009/0106673 A1* | 4/2009 | Jung et al. | 715/757 |
| 2010/0064359 A1* | 3/2010 | Boss et al. | 726/7 |
| 2010/0122094 A1* | 5/2010 | Shima | 713/189 |
| 2011/0060904 A9* | 3/2011 | Whitfield | 713/156 |
| 2011/0179284 A1* | 7/2011 | Suzuki et al. | 713/186 |
| 2012/0330763 A1* | 12/2012 | Gangi | 705/16 |
| 2013/0203388 A1* | 8/2013 | Thomas | 455/411 |

OTHER PUBLICATIONS

Syverson, et al., "Anonymous Connections and Onion Routing", Security and Privacy, 1997. Proceedings., 1997, IEEE Symposium on Oakland, CA,USA May 4-7, 1997, Los Alamitos, CA, USA,IEEE Comput. Soc, US LNKDDOI: I0.1109/SECPRI.1997.601314, May 4, 1997, pp. 44-54.

Pfitzmann, et al, "Anonymity,unobservability, and pseudonymity—a proposal for terminology" Lecture Notes in Computer Science, Springer, DE LNKDDOI:10.1007/3-540-44702-4_1, vol. 2009, Jan. 1, 2001, pp. 1-9.

Chaum, "Security Without Identification: Transaction Systems to Make Big Brother Obsolete", Communications of the ACM, vol. 28, No. 10, Oct. 1985, pp. 1030-1044.

International Search Report for corresponding International Application No. PCT/EP2010/000392, date of mailing Jun. 28, 2010.

* cited by examiner

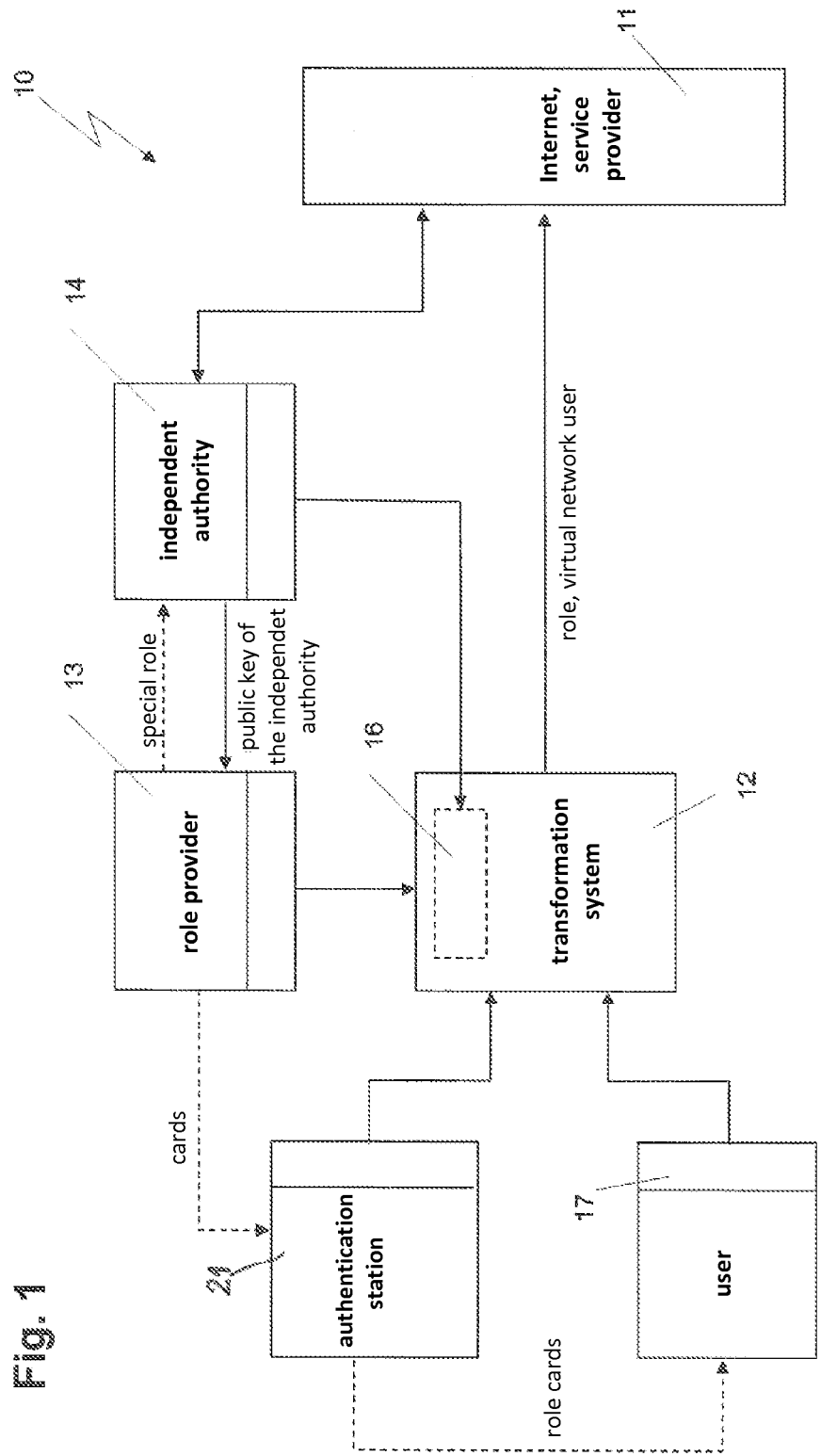

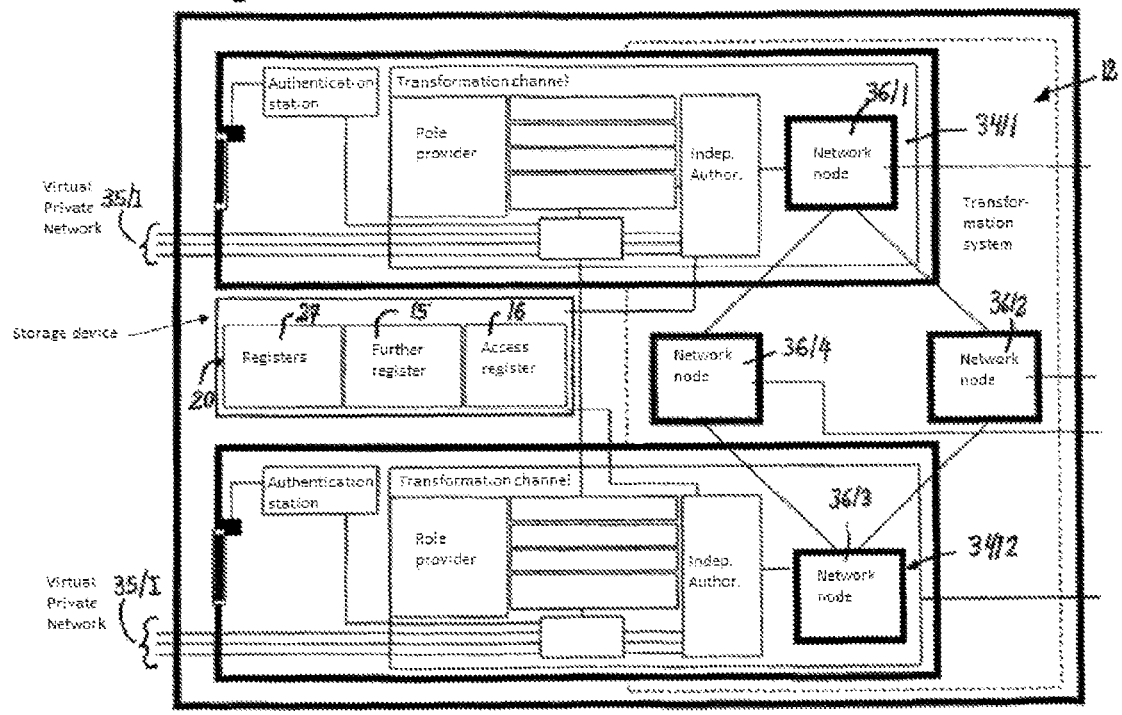

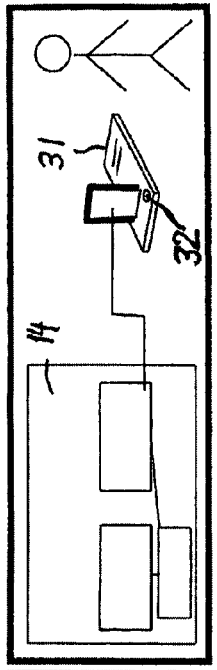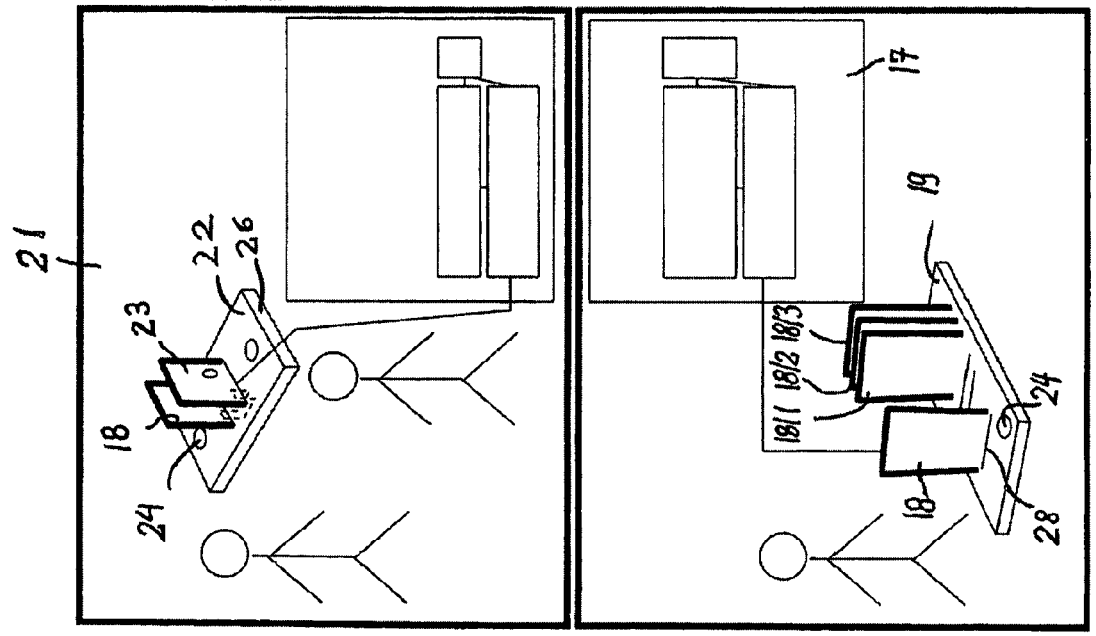

DEVICE FOR GENERATING A VIRTUAL NETWORK USER

CROSS REFERENCE TO RELATED APPLICATIONS

The present application is a continuation of International Application No. PCT/EP2010/000392, filed on Jan. 22, 2010, which claims priority to German Patent Application No. 10 2009 005 810.9, filed on Jan. 22, 2009, the entire contents of each of which are incorporated herein by reference.

FIELD OF THE INVENTION

This invention relates to a device for generating a virtual network user, that, for the purpose of privacy, can be used as a pseudonym under which a physical person or legal entity may gain access to the Internet or a comparable network and engage services that can be implemented via the network, without revealing the identity of the physical person or legal entity concealed behind the pseudonym to third parties who deal with the virtual network user for business or personal relationship purposes, or who do so by snooping on the network. A selectable predetermined combination of attributes, which—in principle—are arbitrarily predetermined, serves to implement the virtual network user. In practice, legal regulations must be met and certain attributes may be required e.g. majority age. These must be combined with real and verifiable attributes. Such a device is, generally speaking, realizable through a transformation system, which can be activated by the input of these attributes into the personal computer of a user and consequently the generation of the virtual network user conveying data streams that are stored in a memory of the transformation system in the order they incurred, so that with the virtual network user contact can be established.

BACKGROUND

Devices of this kind (David Chaum, "Security without identification: Transaction Systems to make big brother obsolete", CHCM (28,10), October 1985, pp. 1030-1044; Stuart Stubblebine and Paul F. Syverson, "Authentic attributes with fine-grained anonymity protection", Financial Cryptography 2000, LNCS serious, Springer-Verlag, 2000), given a careful implementation, have the property to conceal the identity of the user who is behind the pseudonym used as virtual network user, as far as possible, and for this reason the function can provide a "stealth", under which the identity of the user of the pseudonym is hidden or at least can remain undetected.

Systems of this kind thus have the advantage that they protect protected physical persons or legal entities against publishing of personal data and properties, or even against harassment or attack efficiently, but also have the disadvantage, that a carrier of such protection deprives the state authority of lawful access and, without fear of sanctions, can develop activities, which can lead to considerable social harm.

Although it can be assumed that criminal use of such devices cannot remain hidden, and tracing the data track, which is also left by virtual network users, to its creator and thus a prosecution of crime is possible, this undertaking is however so substantially complex that it is no longer proportionate to the reasons of the rule of law, e.g. protecting the public from crime.

OBJECT OF THE INVENTION

The object of this invention is therefore to design a device of the aforementioned kind such that, with due respect for the interests of the user under pseudonym to keep his identity secret, in case of urgent need, e.g. for the purpose of preventing a crime or its investigation, a reasonable possibility of access for the state authority to the identity of the user of the pseudonym is provided.

Hereafter—in addition to the user-related transformation system(s)—at least one other similarly structured aforementioned transformation system is provided, that is associated with an independent authority, for example the state law enforcement authority, that can activate this system and thereby initiate the reading of data from a user-related transformation system, namely data containing information about the network access device over which the virtual network user has been accessing the network and is under suspicion of planning or committing illegal acts.

The implementation of the accessibility of the independent authority, such as law enforcement officers, is simple because of the structural analogy of the access device to the device for generating the virtual network user, and therefore possible to realize with little extra effort and in a cost-effective manner. The inventive design of the device implies a limitation of the user's interests in anonymity which seems however properly balanced, since this limitation is conditional on constitutional measures that in turn serve a good balance of individual and societal interests.

In a preferred embodiment of the inventive device, for the data that after authentication are made available to the independent authority, such as law enforcement, a separate register is provided from where the data foreseen for legal access can be read from memory of the transformation system.

This is an additional security provided so that the independent authority, can view only those data which are necessary for the investigation of a crime or its prevention, however not highly personal data that are not connected with the crime.

By a further preferred embodiment of the inventive device, it can also be used for evidentiary purposes by the user, which controls the virtual network user, when—with a recourse to the actions of the virtual network user—it is proven when and for what purpose they are made.

It is particularly advantageous if the registers, the independent authority can access, are located in separate rooms, from which there is no—physical—access for a person to the memory of a transformation system, which provides, from the perspective of privacy, additional security.

If in a particularly preferred embodiment an inventive device comprises at least and preferably two transformation systems, which can alternatively operate to generate the virtual network user, a simple time-continuous implementation is possible, where in a purposive embodiment of the alternatively operating transformation systems, only one set of access registers for the various categories of data to which access is available, is provided.

Herein it may, for reasons of an effective privacy, more precisely to identify a breach of privacy, which may be possible in the course of maintenance, in the alternative devices generating virtual network users respective data can be a correlated, and, for the case that identical data is simultaneously present in both transformation systems, immediately leads to the discovery of a violation of privacy.

The transformation systems of the various devices generating virtual network users are connected through mixing nodes with a plurality of network access devices. These nodes provide the function of a data "mix" through which the origin of the data is disguised for the desired privacy.

By the features with respect to the independent authority that—in a narrow range defined by the law—is supposed to be able to gain access to user-characteristic data, and by the features with respect to the user, who wants to operate as legally permissible in the network and thereby remain anonymous, simple-to-implement and plausible embodiments of media and readers are given that are assigned to the independent authority or the users respectively, and by the features of the simple and practical ways of implementing such devices are specified.

In a particularly advantageous embodiment of the invention, a mobile reader device is provided, which is coupled to the network access device of the user, e.g. via Bluetooth; such a device can be designed for one type of virtual network users, that for example can solely by activated, when the user proves his entitlement, using a fingerprint sensor appropriately or also for multiple virtual network user roles to which a corresponding plurality of storage media—Role Cards—is assigned, which can be housed in a storage area of the reader, so that after a reaction of the fingerprint sensor, all roles are available.

Further in an advantageous embodiment of the invention an input device is provided by which the virtual network user can be activated alone by control commands the user can enter via an input device, i.e. solely by software means, to allow an activation of a virtual network user, if the said storage media is not available, e.g. has been forgotten or is damaged.

This invention is also using the inventive device to reliably implement a method for generating a virtual network user, that, for the purpose of privacy, can be used as a pseudonym under which a physical person or legal entity to engage services that can be implemented via the network, as well as with the other, whose main characteristic is that only those data that contains information about the network access device(s) over which the virtual network user(s) got into the network—traffic data—is stored in memories of the transformation systems and is accessible to an independent authority, such as the law enforcement authority, whereas storage of the role data that is generated by all the network activity of the user is in volatile memory of the transformation system, which will be deleted when the users session ends.

Hereby with technical means a high level of privacy is achieved.

It is particularly advantageous here if the data concerning the virtual network user—role data, on the one hand, and the data concerning the user—traffic data, on the other hand, are encrypted with different keys.

A particularly high degree of security against unauthorized access to personal data can be achieved if the key, which allows reading the role data, is entered into the transmission system for each session by the user himself.

This procedure ensures that the operator of the facility 10 has no more data available that would point to the identity of the user. It is impossible in principle that the operator can assume the role of a "Big Brother", which is thus largely obsolete.

The inventive device is suitable, thanks to the options given to the user for the generation of different types of virtual network users, to vary the virtual network users between the habitus of an imaginative avatar and a realistic "human" design.

BRIEF DESCRIPTION OF THE DRAWINGS

Further details and features of the invention will become apparent from the following description of a preferred implementation illustrated in the drawings.

In the drawings:

FIG. 1 illustrates a schematically simplified block diagram of an inventive device for generating a virtual network user for explanatory purposes of their function, FIG. 2 illustrates details of the transformation systems of the device according to FIG. 1, also in simplified schematic block diagram representation, FIG. 3a illustrates a schematically simplified perspective illustration of a device in accordance with the applicable authentication module according to FIG. 1, FIGS. 3b and 3c illustrates readers in a corresponding representation to FIG. 3a, FIG. 3d illustrates another reader module functionally corresponding to the reader module of FIG. 3b designed as a mobile device with wireless connection to the network access device.

DETAILED DESCRIPTION

For the device, designated in FIG. 1 collectively as 10, for generating a virtual network user is intended to enable a user of the Internet or a similar network, which is represented schematically in the block diagram representation of FIG. 1 by the block 11, to run the data traffic from its network access device, typically a conventional personal computer (PC), under pseudonym, namely to use a virtual network user as a substitute. The purpose of this measure is to protect itself against unwanted communication with other users of the network 11 in that his true identity is hidden from these users.

For this purpose the device 10 is designed so that a virtual network user will be generated according to the wishes of the user, which, however, before he can be active in the network, has to prove its access permission, e.g. substantiate it by evidence of its legal capacity, in order to satisfy legal requirements. The design of the device 10 also implies that the user agrees that the state authority, of course under the rule of law, has the option to identify the user to pursue investigations if any crimes are committed under the pseudonym, or take preventive measures, if the behavior of the virtual network user raises suspicions of criminal acts.

To implement this underlying concept of the device 10, a designated transformation system 12 is functionally inserted between the personal space of the user, represented through its network of access device 17 (its PC) and the network area 11. The transformation system is operated and controlled by a role provider that provides the user with the service of helping him to create a virtual identity by which it can appear and act in the network.

The role provider is shown in the simplified block diagram representation of FIG. 1 by a merely schematically indicated network access unit 13 about which the role provider e.g. can access the transformation system 12 for purposes of monitoring and assurance of its function. In case of need the state authority, which is in turn merely represented by a schematically indicated input device 14, can access data—in a certain restricted manner—which are storable in a separate register 16 (FIG. 2) of the transformation system 12, of the category, which allows a conclusion about the identity of the physical person or the legal entity that is registered for the network access device 17 which can be used—by entering control commands in the transformation system 12—to control the activity of the virtual network user.

Register 16 is part of a collectively designated storage device 20 (FIG. 2) of the transformation system 12, whose further explanation uses FIG. 2 as explicit reference.

If required, i.e. law enforcement as a possible representative of the independent authority can request access to data, which is stored in the register 16. Access can be granted depending on the design of the transformation system 12, either for the authority directly by its input device 14, or through the intermediation of the role provider role over its access unit 13.

The conception of the natural—real—user in the network 11 quasi representing virtual network user—a role that it plays is provided in the way of a service by a role provider, who offers to the user a selection of roles, by creating a special individual combination of attributes, the virtual network user profile. Here, the "personality" of the virtual network user can be very similar to that of the real user, and a combination of real and verifiable as well as arbitrary attributes, or even, in extreme cases the user can chose attributes completely arbitrarily and correspond to a pseudo-character, immediately recognizable as a product of imagination; nevertheless it can act as a physical person or legal entity. Furthermore, it must be ensured that the state's authority can exercise its right of access to data, to disclose the physical person or legal entity controlling the virtual network user, given a legitimate interest exists and the users interests and rights are protected within the legally defined scope.

In a special embodiment of the device generating the virtual network user, the user acquires the role from a role provider, for example in the form of a chip card (FIG. 3*a*) as storage media 18, where in machine-readable format the attributes that define the "role identity" of the role, which represent the virtual network users in the network, are assigned and stored. The user also receives a designated reader module 19 (FIG. 3*b*), which makes the stored 'roles' data readable and routable via the network access device 17 of the user, typically the personal computer (PC), to the central transformation system 12 of the device 10, which ultimately generates the data characterizing the virtual network user. It should be noted at this point that one way of entering data into the roles of the transformation system 12 of the device 10 can be implemented in such a way that at the definition of the attributes of the virtual network user, i.e. at the purchase of a card 18 these attributes characterizing the role, be entered and stored directly in the data transformation system 12 and thereafter activating the virtual network user only requires the insertion of the card 18 into the insertion slot of the reader module 19, or alternatively in such a way that the above mentioned data, which in their totality represent the role of identity, are read only during the reading operation for the current network access by the transformation system. In both cases, the data is cryptographically protected and stored in the memory 20 of the central transformation system.

Typically, the record, that is created during the acquisition of the role card 18, which characterizes the appearance of the virtual network user, comprises beside the role identity and possibly a password also more comprehensive data—in principle, any—freely modular selectable data, characteristic for the user, verifiable data, e.g. biometric data, that was stored, in addition to data already existing on role card 18, when the card was created and given to the user. The preparation or adaptation for such matter of the reader module 19, which can be provided as standard equipment by the role provider, can take place during or after preparing the role card, for its delivery to the user at the merely schematically indicated authentication station 21 as shown in FIG. 1. Although this station is attributed to the role provider, whose access is revoked, however, in the sense that the contents of a role card issued to the user can not be changed by the provider, which in general also does not know which physical person or legal entity has acquired a certain role.

In a further register 15 in the storage device 20 of the central access unit 12 on the user request data can be stored, e.g. a combination of verifiable attributes of the user and the timing of activities of the respective virtual network user, and can be viewed on the user request under the mediation of the role provider.

As evidence of real features of the user, e.g. for the certification of a certain age, the true indication of sex and/or nationality, the authentication station 21 is equipped with an authentication module 22 (FIG. 3*a*), so designed that on the media 18 data is stored, to certify the fact that both the user as well as the provider-certified person themselves were present at the authentication station 21 and at least one feature has been demonstrated to the certified representative of the role provider, as an verified attribute of the user, or at least as plausibly appearing attribute.

Such authentication can be realized in a way that e.g. both fingerprints: a fingerprint of the user and a fingerprint of the certified representative of the role provider are stored to the role card 18. This occurs after the person certified by the role provider has verified the authenticity of the attribute e.g. by inspecting the identity card of the user or buyer of the role and verifying in this example the legal age, e.g. the buyer is older than eighteen years.

The authentication module 22 of FIG. 3*a* is a special embodiment in such a way designed so that it is equipped with one insertion slot for the role card 18 of the user and a similarly designed insertion slot for role card 23 of the certified representative; the authentication module 22 is activated when both cards 18 and 23 are inserted into the respectively assigned insertion slots; for further explanation in the selected embodiment the biometric data to be scanned are the fingerprints of both persons. Therefor sensors 24 and 26 in FIG. 3*a* are needed, merely indicated schematically.

The thus obtained authentic biometric data, in the example given, together with the data of the certified representative of the role provider are stored in in a designated schematically indicated registers 27 of the transformation system 12.

The reader module 19 (FIG. 3*b*) of the device 10 which is used for the generation of the virtual network user as a pseudonym for the user, is ready-to-use analog to the authentication module 22, when the role card 18 of the user is plugged in in a slot 28 of the read module 19 and thus the role identity on the network access device 17 can be entered into the transformation system 12 of the device 10, where the Internet activities of the virtual network user are controlled by the user using the network access device 17. Also the reader module 19 of the user requires an activation, which takes place when the user actuates a sensor 24 with its fingerprint.

At the reader 19, more "blind" pockets for additional role cards 18/1, 18/2 and 18/3 are provided, for additional roles and configuration of virtual network users respectively, that can be used as pseudonyms—substitute—by the user.

Instead of a reading module 19, as illustrated by FIG. 3*b*, that is connected via a physical data link, such as an electrical or a fiber optic cable to the network access device of the user, also a schematically simplified illustrated mobile reader 119 may be provided that connects via near field radio technology, e.g. Bluetooth. Such a device comprises a special design of a card store collectively denoted 101, that can hold up to four cards in the particular embodiment shown here, each card hold by a slot 102. There is a fingerprint sensor 105 provided, at whose touch the use of any inserted role card is authorized. The selection of role, by which the virtual network user appears to the Internet, is done either by means of the Internet access device or by means of a merely schematically indicated selector 106, which also includes a schematically indicated eject mechanism with levers 104 and footholds 103, which provides a simple way to remove the role cards from the card insertion slot 102. According to the embodiment the card positioned in the top slot 102A is defined as the default role, that is automatically selected and used based on the arrangement of the cards.

The selection of a different role card to change the role identity can be done by selection elements which are not be shown in embodiment, i.e. can be realized as electronic or electromechanical elements in common ways.

Also the reader module 31 (FIG. 3c), which is assigned to a representative of the independent—legal—authority, is in the embodiment selected for explanation, equipped with a biometric sensor, for sensing biometric data of an authorized representative of state, particularly a fingerprint sensor 32, which activates read access to the role card 33 via the device 14 of the independent authority or their representatives can now enter identifying data via the data access unit 12 to enable legal access to the access register 16 that holds the relevant information to disclose the identity of the network access device 17 of the "real" user and thus the user can be seen.

This access is implemented in detail as follows:

The authentication process with the activation of the virtual network user leads to a user-to-role mapping, which is stored in the access unit 12, for example, in a row, the first data block as the role identity, the second data block associated with the user identity, for example the characterizing data of the network access device 17. Here, the role identity on one hand and the user related relevant traffic data on the other hand are encrypted with different keys. The role provider is, according to this important aspect of the invention, neither able to read the role data, i.e. role identity, nor other data that relates to the user data, i.e. user identity. The role provider is only able to read those data, to authenticate the user, i.e. to recognize the user as legitimate customer, whereby the user can appear even under a pseudonym.

The key with which the role data can be decrypted is not stored at the role provider, but is entered by the user in the transformation system for every session as a preparation of service usage. The key with which the user data is readable, is only known to the state authority, which in turn is not able to decipher the role identity. If a virtual network user is suspected of having committed a crime, the state authority, such as the prosecutor who is in possession of the key for the user data, can ask the role provider to transfer records linked to the role of the virtual network user into the access register 16. In this case information becomes readable to the prosecutor necessary to determine at least the network access device 17 used by the actual perpetrator.

Analogue to this approach, additional access for third parties can be foreseen, to enable the implementation of new services. For example a new service for another service provider, e.g. the verified delivery address can be made available to a logistics company for certain deliveries of purchases made in an "online shop".

As shown in FIG. 2, the special embodiment of the transformation system 12 of an inventive device 10 for generating a virtual network user includes the transformation system with two transformation channels referred here as 34/1 and 34/2 respectively. These channels are connected via so called virtual private networks 35/I and 35/II, each with the authentication module 21 (FIG. 3a), the access device 21 (FIG. 3a) and reader module 19 of the user, as well as the input device 14 (FIG. 3c), which is connected to the reader module 31 for an independent authority.

These transformation channels 34/1 and 34/2 are connected to the network via a plurality of network nodes 36/1 to 36/4 with each other and with other network access devices from other users of the network 11. The network nodes 36/1 to 36/4 provide also the function of mix-nodes, in which the data streams are collected, repetitions deleted, data streams recoded and resorted so that the origin of messages is obscured. The mix node thus mediates the function of technical data mix, a mix cascade respectively.

This type of insertion of the inventive device 10 in the "local" structure of the network 11 results in an increased population in the access area of the virtual network users thus improving protection against unwanted identification. Such an increase in population of the considered network area can also be achieved in a way that the transformation system 12 automatically generates phantom virtual network users corresponding to an increase of the virtual total user population.

Without loss of generality, we assume that the two transition channels 34/1 and 34/2 of the transformation system 12 are alternately engaged in the implementation of the user as the virtual network user, e.g. so that always only one of the two channels in terms of generating the virtual network user is active, and both channels alternate in this function, e.g. implement in such a way that they perform alternately for equal periods of time, the transformation function by which the virtual network user is created; it is further assumed that in the event of a malfunction of one channel 34/1 or 34/2 the other channel 34/2 or 34/1 takes over immediately the function of the failed channel, so that a time-continuous implementation of the transformation function is guaranteed to the user. Based on this "redundant" design of the transformation unit 12, the virtual network user's presence is ensured over time, and disclosure of the true identity of its users avoided from a malfunction of the device 10.

Of significance here is that the person who carries out maintenance of one channel of the two transformation channels, has no access to the other active transformation channel which handles all traffic. Therefore in a preferred design of the transformation system 12 according to FIG. 2, functional components assigned to each of two transition channels 34/1 and 34/2 are located in different rooms which are locked against each other.

In the 2-channel version of the transformation system 12, it is important that the channels are working strictly alternative, i.e. data, documenting the activity of the virtual network user is generated and stored in only one of the two channels. In an appropriate design of the device 10 therefore all data is stored only transiently in the channels 34/1 and 34/2 of the transformation system 12. Accordingly, when a channel of the transformation system is opened by one person for maintenance, before being released into the channel for access, all memory of the channel will be erased with information-free data sets, such as "zeros" ("data flush"). This also applies in case of data that is generally stored within the channels on a non-volatile storage media, i.e. such as a computer hard disk. This can for example be the case at a swap out of content due to insufficient memory from volatile memory to non-volatile storage media (so-called "paging") or saving the contents of a volatile memory within a channel on non volatile medium in the event of a malfunction in the processor (called "core dump").

For related verification of such strict alternative operation, a correlator, which is not shown, is suitable. The correlator is capable of performing a correlation function of generated data from time to time from the two alternative channels that are stored in chronological order. If this correlation leads to a positive result, it is an indication of an at least temporary combination of the two channels with each other and thus an indication of a malfunction or failure of privacy, and a trigger for an inspection of the device 10.

We claim:

1. A device for generating a virtual network user, that, for the purpose of privacy, is used as a pseudonym under which a physical person or legal entity is enabled to gain access to the Internet and to engage services that are implemented via the network, whereby the virtual network user is defined by a selectable predetermined combination of attributes or arbitrarily predetermined attributes, comprising:
   a network access device, and a transformation system that serves to implement the virtual network user, conveying data streams that are stored in a memory of the transformation system in the order they incurred, so that with the virtual network user contact can be established, whereby the transformation system is activated by the network access device upon entering the attributes into the network access device,
   and further comprising:
   an access system, which is assigned to an independent authority, and which if activated initiates readout of data from the memory of the transformation system which contains information about the network access device through which the virtual network user accessed the network,
   wherein the independent authority as proof of its authorization to access data that identifies the user is provided a media by an operator of the network where the virtual network user is active, on which certified data in machine-readable format is stored, the data proving the identity and authorization of the physical person that represents the independent authority to access the memory of the transformation system, and that for the verification of access rights and release of the access a reader is provisioned, which generates from a conjunctive combination of the read data from the media with identifying information that characterize the representatives of the independent authority, an access-confirmatory data set,
   wherein the user obtains access to the transformation system that generates the virtual network user with a media on which data is stored in machine-readable format, which contains verifiable data of the user or exclusively characterizing data of the virtual network user, and that the release of network access is obtained using a reader, from a service provider, which generates confirmatory data to release access to the transformation unit by a conjunctive link of the data stored on the media, and verifiable data handed over to the service provider and verified prior to receiving the card, which allows verification of the fulfillment of necessary conditions,
   wherein at an authentication station an authentication module is provided, that is used while creating a role card characterizing the virtual network user a role provider confirms with the user information that requires certification is at least verifiable by the role provider, for plausible reasons, and
   wherein the authentication module with the role provider, on one hand, and the user, on the other hand, is equipped with individually associated input devices, by which uniquely characterizing properties are entered, at the same time or within an input period of defined duration.

2. The device of claim 1, further comprising an independent access register into which the data to be accessed from the memory of the transformation system are written such that the data, on justified request of the independent authority, is made available.

3. The device of claim 2, wherein the access register is located in a different room than the room where the transformation system is located and from which no physical access to the memory of the transformation system is possible.

4. The device of claim 1, further comprising at least one register in that data is written, which documents the actions of the virtual network user.

5. The device of claim 1, wherein the transformation system has at least two transformation channels, which alternatively implement the generation of the virtual network user.

6. The device of claim 5, wherein each pair of transformation channels, which operate alternatively, only one register arrangement for the access to data of different categories is assigned.

7. The device of claim 6, characterized in that the data created in the alternatively operating channels generating virtual network users are correlated from time to time.

8. The device of claim 1, wherein the transformation system is connected over mix nodes with a plurality of network access devices.

9. The device of claim 1, further comprising a portable mobile reader of the device carriable along by the use, which is adapted to be connected with the network access device by near field radio technology.

10. The device of claim 1, further comprising an input device that allows activation of the virtual network user solely by user-initiated control commands.

* * * * *